US008170930B2

(12) United States Patent
Brown et al.

(10) Patent No.: US 8,170,930 B2
(45) Date of Patent: May 1, 2012

(54) SYSTEM AND METHOD FOR AUTOMATED NOTIFICATION

(75) Inventors: Steven T. Brown, Franklin, WI (US); Kathleen R. Werth, New Berlin, WI (US)

(73) Assignee: Metavante Corporation, Milwaukee, WI (US)

( * ) Notice: Subject to any disclaimer, the term of this patent is extended or adjusted under 35 U.S.C. 154(b) by 690 days.

(21) Appl. No.: 11/458,864

(22) Filed: Jul. 20, 2006

(65) Prior Publication Data
US 2008/0021790 A1 Jan. 24, 2008

(51) Int. Cl.
G07B 17/00 (2006.01)
G06Q 40/00 (2006.01)
G06K 5/00 (2006.01)
H04M 5/00 (2006.01)

(52) U.S. Cl. ........ 705/30; 705/35; 235/380; 379/266.01

(58) Field of Classification Search ............... 705/35
See application file for complete search history.

(56) References Cited

U.S. PATENT DOCUMENTS

| 4,083,302 | A | * | 4/1978 | Bello et al. ............... 101/269 |
| 5,621,790 | A | * | 4/1997 | Grossman et al. ....... 379/266.08 |
| 6,349,290 | B1 | * | 2/2002 | Horowitz et al. ............... 705/35 |
| 7,016,477 | B2 | | 3/2006 | Contractor |
| 2007/0045403 | A1 | * | 3/2007 | Slonecker ............... 235/380 |

* cited by examiner

Primary Examiner — F. Ryan Zeender
Assistant Examiner — Denisse Ortiz Roman
(74) Attorney, Agent, or Firm — Finnegan, Henderson, Farabow, Garrett & Dunner, LLP

(57) ABSTRACT

Systems and methods are provided which make use of outbound calling systems to automate notification campaigns. Automated campaigns using outbound calling systems can provide a number of significant advantages over the traditional notification campaign, potentially resulting in faster, more efficient, more accurate, and more cost-effective notification campaigns.

31 Claims, 6 Drawing Sheets

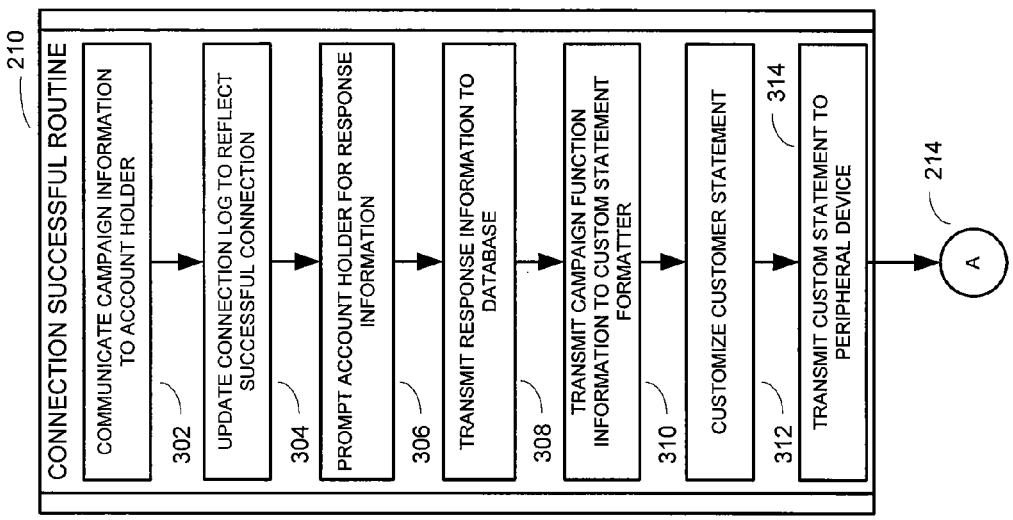
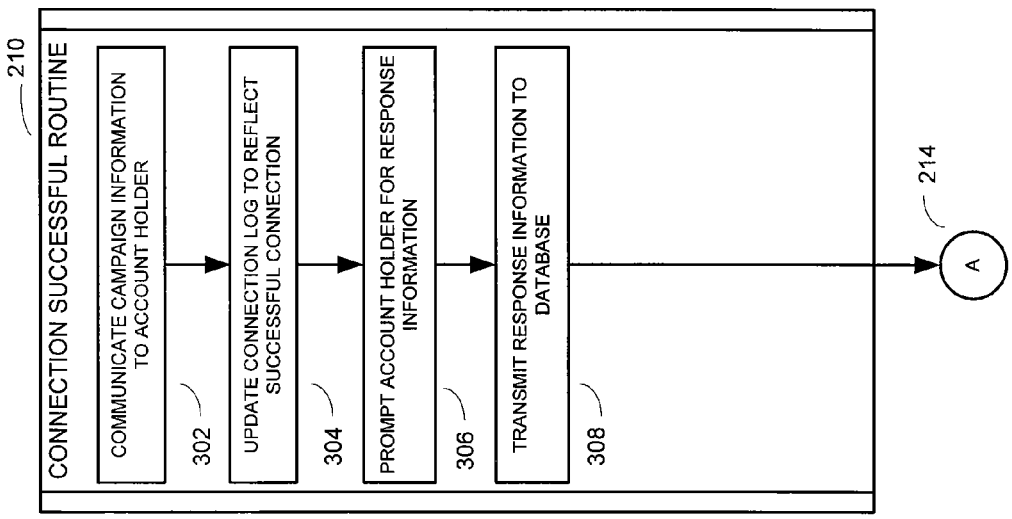
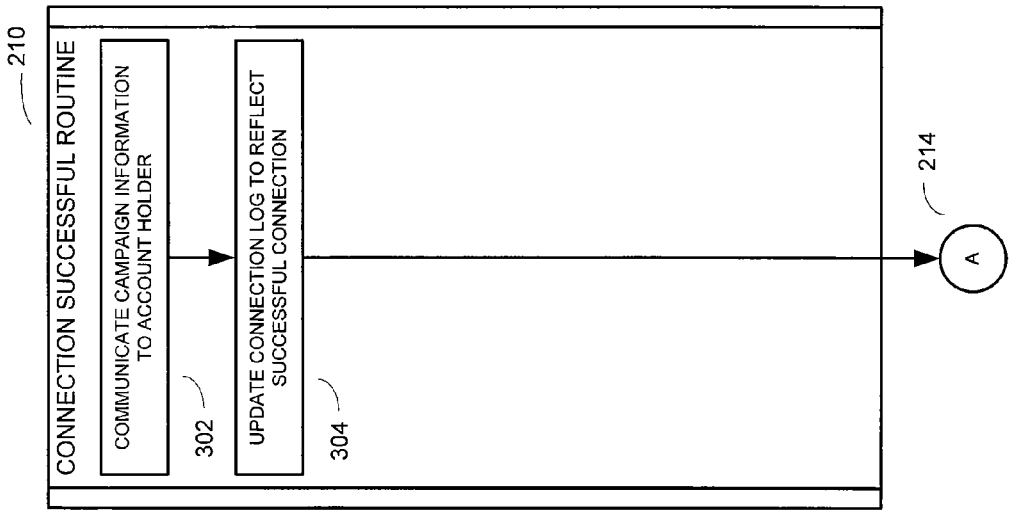

SYSTEM AND METHOD FOR AUTOMATED NOTIFICATION

BACKGROUND OF THE INVENTION

This application relates generally to systems and methods for customer notification. More specifically, this application relates to automated notification of holders of suspect financial accounts and instruments.

Financial institutions around the world offer a variety of financial instruments to their account holders. These instruments include investment and retirement accounts, savings and checking accounts, debit and credit card accounts, and many others. Often, a financial institution desires, or is required, to notify consumers of information relevant to their accounts. To accomplish that goal, the institution may execute a notification campaign.

Traditionally, financial institutions handle these notification campaigns with mailings or live operator calls to affected or potentially affected customers. However, executing a notification campaign in this way can be difficult and expensive for a number of different reasons, including the following. First, the affected or potentially affected customers may experience a variety of balances, credit limits, reward programs, financial histories, spending patterns, ages, and other characteristics and needs. Second, financial institutions may require or desire that the notification campaigns be tailored to specific customers, customer profiles, or in other ways. Third, the inherent limitations of operators, the postal service, and other logistical considerations can delay notification of consumers or introduce errors into the campaign, sometimes to the detriment of intended or unintended recipients.

The result of these and other reasons is that the typical execution of notification campaigns is unsatisfactory. Thus, it is desirable to have a mechanism that would permit financial institutions to execute these notification campaigns rapidly, efficiently, accurately, and cost-effectively.

BRIEF SUMMARY OF THE INVENTION

Embodiments of the invention can address this condition in the art by making use of outbound calling systems to automate notification campaigns. Automated campaigns using outbound calling systems can provide a number of significant advantages over the traditional notification campaign, potentially resulting in faster, more efficient, more accurate, and more cost-effective notification campaigns.

In a first set of embodiments, a method is provided for executing an automated network-based notification campaign. The method acquires suspect account information. The suspect account information comprises customer information, a telephone number, and campaign information. The customer information and telephone number correspond to an account holder. The suspect account information is transmitted to an outbound calling system. The telephone number is parsed from the suspect account information; and, using the telephone number, the method attempts to establish a network connection between the outbound calling system and the account holder. If the call is successful, the outbound calling system runs a connection successful routine. The routine communicates at least a portion of the campaign information to the account holder. The routine also updates a connection log to reflect the successful establishment of the network connection. If the call is unsuccessful, the outbound calling system runs a connection unsuccessful routine. In this case, the routine updates a connection log to reflect the failed establishment of the connection.

It will be appreciated that different types of notification campaigns may use different suspect account information. In one type of notification campaign, the suspect account information comprises information from a compromised financial instrument. In another type of notification campaign, the suspect account information comprises information from a non-activated financial instrument. In yet another type of notification campaign, the suspect account information comprises information from a financial instrument experiencing atypical account activity.

In some embodiments, the connection successful routine further comprises prompting the account holder to collect response information and transmitting the response information to a database. In certain of these embodiments, the response information comprises dual-tone multiple-frequency (DTMF) signals. Additionally, in certain of these embodiments, the database is a call base; while in other embodiments, the database is the outbound calling system. Further, in certain of these embodiments, the database is directed by at least one of the outbound calling system, the prompter, or an institution.

In other embodiments, the connection successful routine further comprises transmitting campaign function information to a custom statement formatter, customizing a customer statement based on the campaign function information, and transmitting the customer statement to a peripheral device. In certain of these embodiments, the campaign function information derives from at least one of the customer information, the campaign information, the connection log, or the response information. Additionally, in certain of these embodiments, the peripheral device may be a printer; which may, in some cases, be a card printer.

In other embodiments, the method performs statistical analysis on at least a portion of the connection log. In some embodiments, the method updates the suspect account information based on the connection log to enhance the efficacy of the notification campaign.

In still other embodiments, the method secures sensitive information. In some embodiments, the sensitive information comprises sensitive portions of at least one of the customer information, the campaign information, the connection log, or the response information.

In a second set of embodiments, a system is provided for executing an automated network-based notification campaign. The system comprises suspect account information, an outbound calling system, a prompter, and a database. The suspect account information comprises customer information corresponding to an account holder, a telephone number corresponding to the account holder, and campaign information. The outbound calling system comprises an operative connection to a telephone network, instructions for establishing a network connection via the telephone network to the telephone number, and instructions for communicating at least a portion of the campaign information to the account holder. The prompter comprises handling instructions for handling response information, and an operative connection to at least one of the account holder or the outbound calling system. The database comprises an operative connection to at least one of the outbound calling system or the prompter.

Some embodiments of the system are configured to perform various embodiments of the methods summarized by the first set of embodiments described herein.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Labels and illustrations depicting singular components are intended to illustrate also embodiments comprising a plurality of some or all of those components.

FIGS. 3A-3C are flow diagrams that summarize a connection successful routine in various embodiments;

DETAILED DESCRIPTION OF THE INVENTION

Embodiments of the invention making use of outbound calling systems to execute automated network-based notification campaigns. Automated campaigns using outbound calling systems can provide a number of significant advantages over the traditional notification campaign. These advantages include, but are not limited to, the ability to call numerous customers around the world without hiring staffs of operators; to simultaneously run a variety of campaigns, each with a different script and different intended recipients; to individually tailor each call to each intended recipient; the ability to receive touch-tone or similar response choices; and others. The result is that these advantages can provide a faster, more efficient, more accurate, and more cost-effective notification campaign.

Some different embodiments of the invention relate to different types of notification campaigns.

One type of notification campaign may be used after a financial institution experiences a security breach, compromising the account security of some or all of its customers. When such security breaches occur, it is not uncommon for thousands of customers to be affected. The financial institution may have legal and business-related obligations to notify potentially affected customers of the breach. More specifically, a financial institution may become aware of one or more compromised credit/debit/prepaid card accounts. The institution may desire to inform affected account holders, giving them options, including canceling or blocking accounts, issuing new cards, or speaking to customer service representatives. In fact, other types of financial instruments could be similarly compromised; or any of these instruments could be suspected of one or more anomalous, unusual, or illicit activities, including fraud, theft, or misuse.

Another type of notification campaign may be used by a financial institution to execute a public relations or public service announcement. These types of informational campaigns may inform customers of special promotions, new regulations, or even potential dangers to accounts. More specifically, an institution may desire to remind customers to activate a card, make IRA contributions, or anything else which may or may not be time sensitive.

Figure 1:
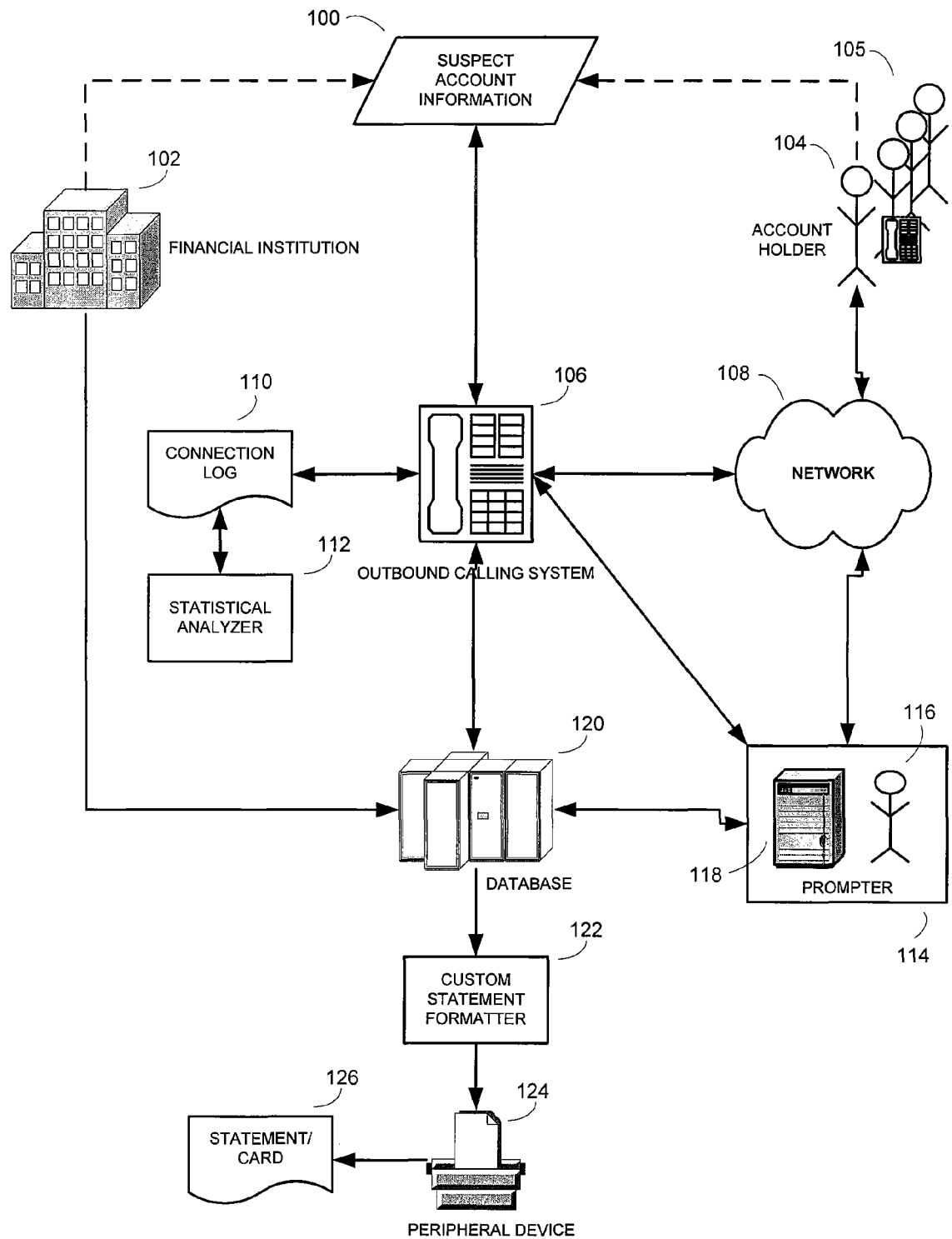
FIG. 1 is a schematic diagram illustrating a system architecture which may be used with embodiments of the invention.

An overview of a system architecture in which embodiments of the invention may be implemented is illustrated in FIG. 1. Suspect account information 100 is acquired from a database, financial institution 102, or other source. As used herein, account information is suspect when it is either actually subject or suspected of being subject to certain anomalous conditions. A suspect condition may include, for example, an account believed to be compromised by fraudulent activity. The suspect account information 100 comprises at least customer information, a telephone number, and campaign information. The customer information and telephone number correspond to an intended recipient of the notification campaign. For illustrative purposes, the intended recipient is shown and referred to as an account holder 104, but it will be understood that the recipient may also be a different type of customer, a potential customer, or any other desired recipient. The customer information may include any other profile information of the account holder 104, such as the name, address, credit limit, spending patterns, account number, or any other desired information. The telephone number may also be part of the customer information. The campaign information may include the type of campaign, notification script, merge fields for merging the notification script with customer information, or any other desired information.

The suspect account information 100 is transmitted to an outbound calling system 106. The telephone number is parsed from the suspect account information 100, and the outbound calling system 106 attempts to establish a connection over a network 108 to the account holder 104. This may be accomplished by placing a call over the public-switched telephone network (PSTN) using the telephone number. However, it will be appreciated that a similar network connection could be achieved using a variety of network functions over any internal or external network and using any form of network address. For example, voice packets could be sent over the Internet to a recipient's Voice over Internet Protocol (VoIP) phone located at a particular IP address.

If the connection is successful, the outbound calling system runs a connection successful routine. The routine may communicate some or all of the campaign information to the account holder 104. The routine may also update a connection log 110 to reflect the successful establishment of the connection. This connection log may be a file or files and may be stored in a central database, in the outbound calling system 106, or in any other accessible location.

Alternatively, if the connection is unsuccessful, the outbound calling system runs a connection unsuccessful routine. The routine may update a connection log 110 to reflect the failed establishment of the connection. This connection log 110 may be the same or different from the connection log 110 updated by the connection successful routine.

In some embodiments, the system comprises a prompter 114. The prompter 114 may include an operator 116 communicating choices to the account holder 104 and waiting for response information from the account holder 104. Alternatively or additionally, the prompter 114 may include an Interactive Voice Response system (IVR), a Voice Response Unit (VRU), or any other similar computer-based system 118 for communicating options and receiving response information from the account holder 104. The response information may be communicated or received as spoken by the account holder 104, as dual-tone multiple-frequency (DTMF) tones entered from the account holder's 104 telephone, as data packets from a program, or as any other useful format. In order to communicate prompts and receive response information, the prompter 114 may be connected to the account holder 104. This connection can be established directly over the network 108, or indirectly through at least the outbound calling system 106.

For illustrative purposes, say a connection is successfully established between the outbound calling system 106 and the account holder 104. The outbound calling system 106 may also establish a connection between the prompter 114 and the account holder 104. At this point, the outbound calling system 106 may communicate the campaign information to the account holder 104 in a way that provides the account holder 104 with various options. For example, the options may state: "Press or say '1' to block your current credit card account and issue a new card"; "press or say '2' to speak with a customer service representative"; etc. The prompter 114 could then listen for response information from the account holder 104, and the system could respond to the response information. For example, using the illustrative options provided above, a selection of "2" may cause the outbound calling system 106 (or the prompter 114) to place a call to a customer service call center.

In some embodiments, the system further comprises a database 120. The database may include any suitable storage device or medium, including, but not limited to a data server, card base, or internal storage of the prompter 114 or outbound calling system 106. In certain embodiments, this database can be directed either manually, by batch process, or by some other mechanism by any or all of the financial institution 102, the prompter 114, or the outbound calling system 106.

Some other embodiments of the system further comprise a custom statement formatter (CSF) 122 and a peripheral device 124. The CSF 122 may be operatively connected to the database 120, such that the database 120 can communicate campaign function information to the CSF 122. The campaign function information may include at least any campaign-based information desired to be transmitted to the CSF 122, including, but not limited to, campaign-specific text and formatting, or information from the customer information, the response information, the connection log, or the campaign information. The CSF 122 may use this information to customize a customer statement 126. Based on the type of campaign, this statement may be a form letter, billing statement, legal compliance document, new credit card, or any other desired output. The information to produce the statement 126 is transmitted to a peripheral device 124 which may be operatively connected to the CSF 122. Though this peripheral device 124 will typically be a printer for printing the statement 126, it may also be one or more of any other desired type of device, including, for example, card printers, drives for writing the statement 126 to computer readable media, or devices for sending electronic versions of the statement 126.

For illustrative purposes, say a connection is successfully established as illustrated above, and the same options are provided to the account holder 104. However, this time, the account holder 104 selects option "1" ("to block your current credit card account and issue a new card"). This selection may cause information to be sent to the database 120, to the financial institution 102, and/or to any other location or recipient, instructing the recipient of the account holder's 104 selection. The financial institution 102 may update one or more systems to reflect the blocked account and the issuance of a new card. The database 120 may send information and instructions to the CSF 122, which would format a new credit card and a corresponding mailing. The CSF 122 could then send the card information to a peripheral card printer 124 and the corresponding mailing information to a peripheral statement printer 124, resulting in the production of a new credit card 126 and a corresponding mailing 126 to be mailed to the account holder 104.

In some other embodiments, the system further comprises a statistical analyzer 112. The statistical analyzer 112 may be configured to read and analyze data from the connection log 110. The statistical analyzer 112 may also be configured to report the results of its data analysis. This data analysis may include any standard database operation, such as, sorting, culling, and searching data. This data analysis may also include more complex and/or tailored functions, including, but not limited to, detecting trends and patterns in the data, predicting future results based on interpolation and extrapolation, analyzing the effect of campaigns on data trends, and discovering ways to enhance the efficacy of a notification campaign. For example, the data analysis may discover that males between 35 and 40 years of age with annual incomes between $100 and $200 thousand tend to be most likely reached between the hours of 6:00 pm and 7:00 pm. The campaign can be updated based on that information to schedule calls to account holders 104 matching that profile for sometime between the hours of 6:00 pm and 7:00 pm.

In other embodiments, the system further comprises an information security system for securing sensitive information. The sensitive information may comprise sensitive portions of at least one of the customer information, the campaign information, the connection log, the response information, or any other information desired or required to be kept secure. The security system may secure data while in transit and/or while in temporary or permanent storage. Security may include, but is not limited to, physical security (such as locking file cabinets, safes, fire prevention, etc.) and/or virtual security (such as encryption, password protection, intrusion detection, etc.). Security may also be adjusted in any number of ways for such things as varying types of information, varying types of networks, and varying types of personnel.

Figure 2:
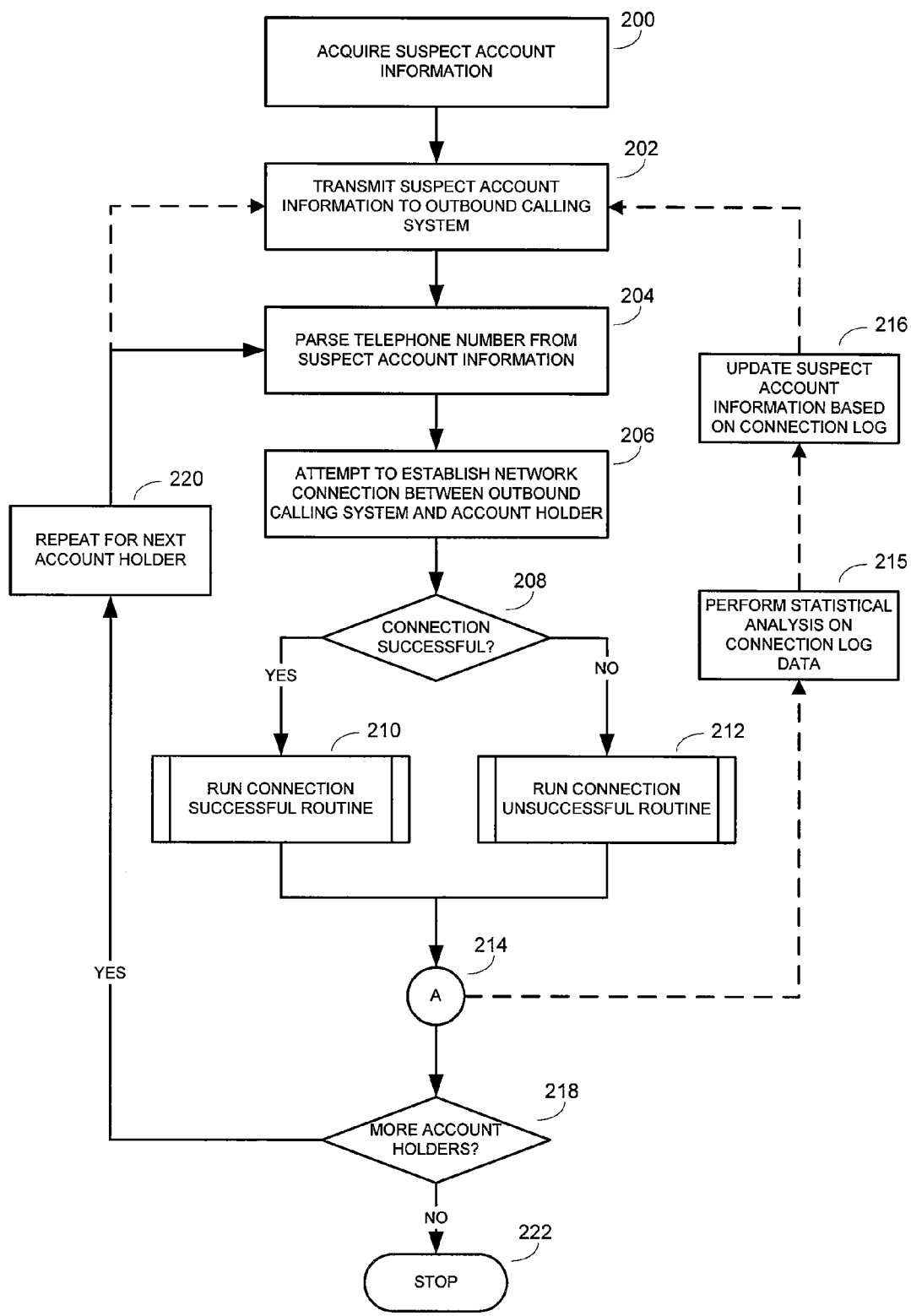
FIG. 2 is a flow diagram that summarizes methods of the invention in various embodiments.

FIG. 2 provides a flow diagram that summarizes methods of the invention in various embodiments. The steps of the method should be construed as broadly as possible, incorporating at least the various embodiments discussed with reference to FIG. 1.

Suspect account information may be acquired 200. The suspect account information may comprise at least customer information, a telephone number, and campaign information. The customer information and telephone number can correspond to an intended recipient of the notification campaign. While the intended recipient will typically be an account holder, it will be understood that the recipient may also be a different type of customer, a potential customer, or any other desired recipient.

The suspect account information may be transmitted 202 to an outbound calling system. The telephone number may be parsed 204 from the suspect account information, and the establishment of a network connection may be attempted 206 between the outbound calling system and the account holder.

A determination can be made 208 as to whether the connection attempt is successful. If the connection is unsuccessful, a connection unsuccessful routine may be run 212. Running the connection unsuccessful routine 212 may comprise updating a connection log to reflect the failed establishment of the connection. Alternately, if the connection is successful, a connection successful routine may be run 210.

Various embodiments of running the connection successful routine 210 are illustrated by FIGS. 3A-3C. In some embodiments, running the connection successful routine 210 may comprise communicating 302 at least a portion of the campaign information to the account holder, and updating 304 a connection log to reflect the successful establishment of the connection. In other embodiments, running the connection successful routine 210 may further comprise prompting 306 the account holder and listening for response information, and transmitting 308 the response information to a database. In yet other embodiments, running the connection successful routine 210 may further comprise transmitting 310 campaign function information to a custom statement formatter (C SF), customizing 312 a customer statement with the CSF, and transmitting 314 the customer statement to a peripheral device. In certain embodiments, the peripheral device may be a printer, or more specifically a card printer.

Returning to FIG. 2, in some other embodiments, the suspect account information is updated 216 based on information from the connection log. For example, a flag may be inserted into the suspect account information telling the outbound calling system to try again later if the connection was unsuccessful. In certain embodiments, the method further comprises performing 215 a statistical analysis on data from the connection log. The results of the statistical analysis may then be used to enhance the efficacy of the notification campaign.

In still other embodiments, the method further comprises securing sensitive information. The sensitive information may comprise sensitive portions of at least one of the customer information, the campaign information, the connection log, the response information, or any other information desired or required to be kept secure.

Is will be appreciated that a notification campaign will typically be directed at a queue of multiple account holders. As a result, the method may progress to a decision point where it may check 218 whether more account holders remain in the queue 105. If so, the method may repeat 220 for the next account holder. Alternatively, if no account holder 104 remains in the queue 105, the method may stop 222.

Figure 4:
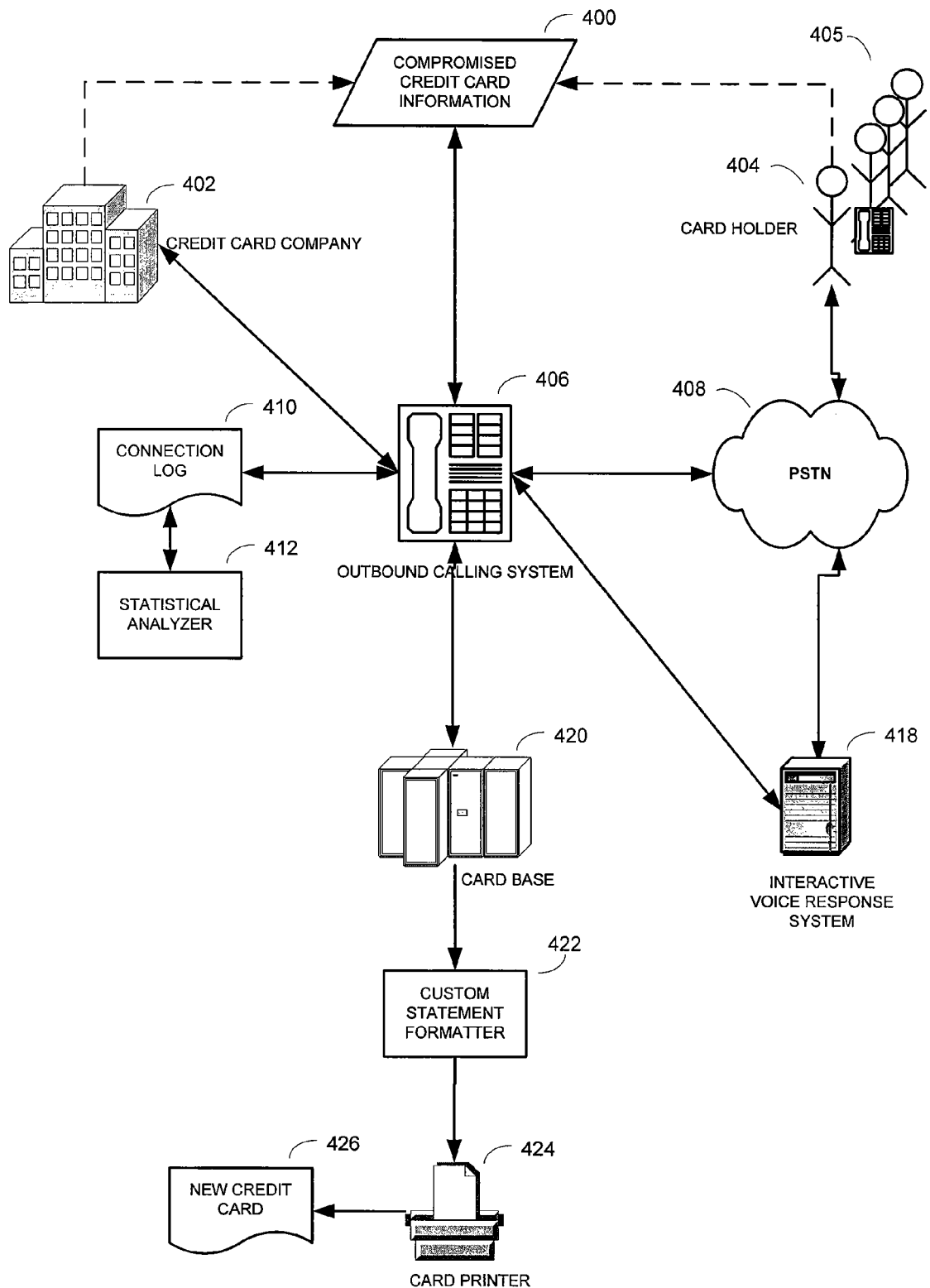
FIG. 4 is a schematic diagram illustrating a system architecture which may be used with a specific embodiment of the invention.
Figure 5:
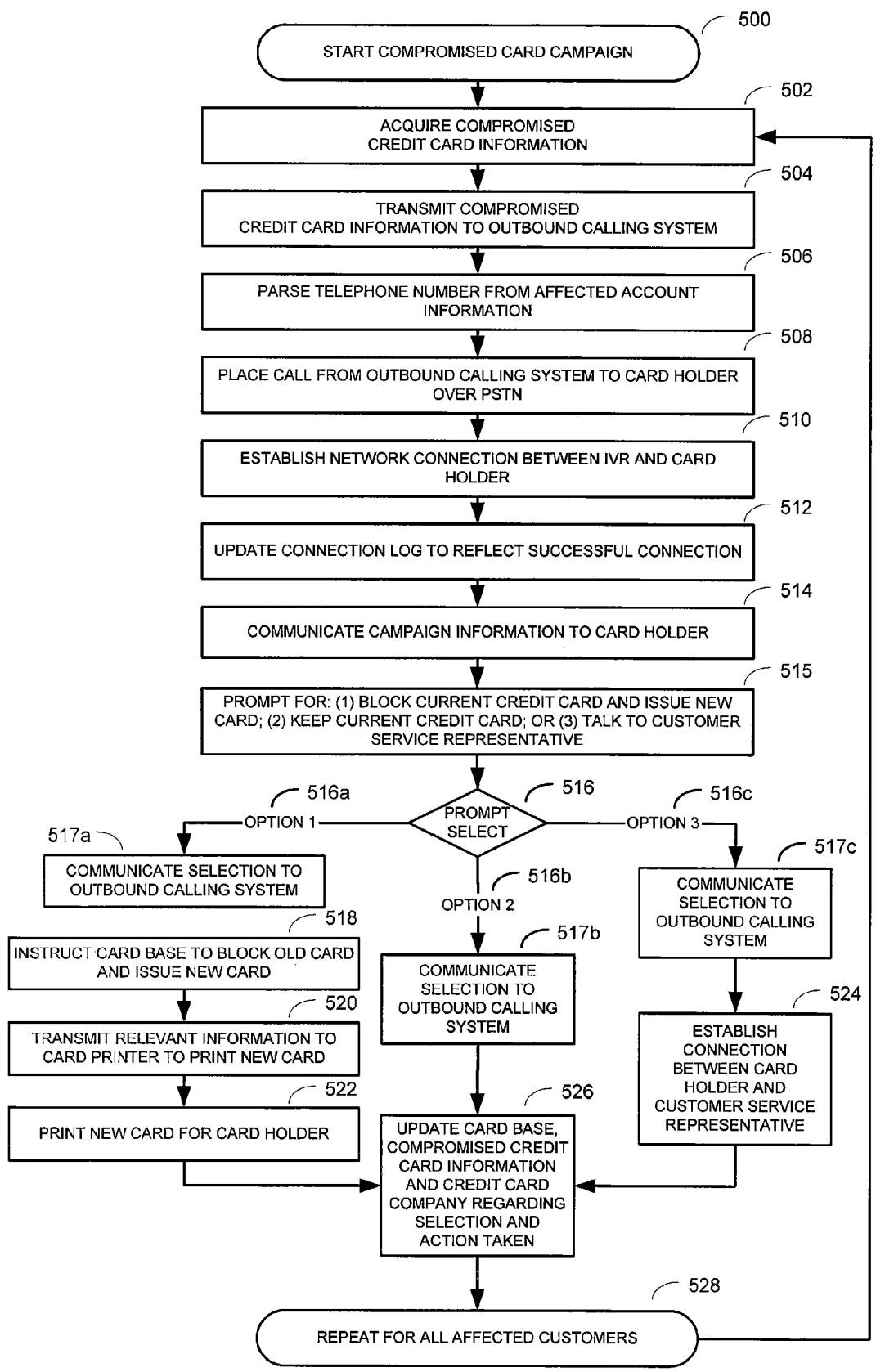
FIG. 5 is a flow diagram that summarizes methods of the invention in a specific embodiment.

FIGS. 4 and 5 respectively provide a schematic diagram and a flow diagram which illustrate a system architecture and method which may be used with a specific embodiment of the invention. The specific embodiment describes a system and method for executing an exemplary notification campaign for a compromised credit card account. This specific embodiment is illustrated purely for exemplary purposes, and should not be taken as limiting the scope of the invention.

The compromised card notification campaign begins 500. Compromised credit card information 400 is acquired 502 from a credit card company 402. The compromised credit card information 400 comprises customer information, a telephone number, and campaign information. The customer information and telephone number correspond to a first card holder 404 in a queue 405 of card holders intended to receive the notification. The campaign information comprises a script in a format readable by an outbound calling system 406. The script contains fields for merging the customer information into the script. For example, prior to a merge, a script may read "Good evening, this is BankCorp. If we are speaking with [$AcctHldr], please say 'yes' or press '1' . . . . " Here, [$AcctHldr] represents a field into which the name of the card holder 404 may be merged. Thus, subsequent to a merge, the same script may read "Good evening, this is BankCorp. If we are speaking with John Doe, please say 'yes' or press '1' . . . . "

The compromised credit card information 400 is transmitted 504 to an outbound calling system 406. The telephone number is parsed 506 from the compromised credit card information 400. The outbound calling system 406 places a phone call over the PSTN 408 to the card holder 404. In this exemplary illustration, the connection is successful. The outbound calling system 406 establishes a second connection over the PSTN 408 between an interactive voice response (IVR) system 418 and the card holder 404. The connection log and any relevant statistical analyses are updated 512 to reflect the successful connections. For example, the financial institution may query the system in the future (possibly as part of a future notification campaign) to determine whether this particular card holder tends to be home at this particular time of day.

The outbound calling system 408 communicates 514 the campaign information (the script) to the card holder 404. In this exemplary case, as part of the campaign information, the outbound calling system 408 prompts 515 the card holder 404 to select one of the following: '1' to block the current credit card and issue a new card; '2' to ignore the notification and keep the current card; or '3' to speak with a customer service representative. Wherever the card holder 404 is prompted 514, the IVR 418 waits for a response from the card holder.

The card holder 404 selects 516 a prompt. In a first case, the card holder selects 516a option '1'. The IVR 418 communicates 517a the card holder's 404 selection to the outbound calling system 406, which, in turn, sends 518 a batch command to a card base 420 to block the current account and issue a new card. The card base 420 transmits 519 relevant information and instructions to a custom statement formatter (CSF) 422, which would format a new credit card. The CSF 422 then transmits 520 the card information to a peripheral card printer 424, which prints 522 a new credit card 426 to be mailed to the account holder 404. The card base 420, compromised credit card information, and credit card company 402 are updated 526 regarding the blocking and reissuing of accounts.

In a second case, the card holder selects 516b option '2'. The IVR 418 communicates 517b the card holder's 404 selection to the outbound calling system 406. The card base 420, compromised credit card information, and credit card company 402 are updated 526 regarding the selection of the account holder 404 to keep the current account active and refuse the new credit card.

In a third case, the card holder selects 516c option '3'. The IVR 418 communicates 517c the card holder's 404 selection to the outbound calling system 406. The outbound calling system 406 establishes 524 a third connection over the PSTN 408 between the card holder 404 and a customer service representative stationed in one of the credit card company's 402 offices. The card base 420, compromised credit card information, and credit card company 402 are updated 526 regarding the selection of the account holder 404 to speak with a customer service representative. Is will be understood that the actions taken by the customer service representative could be similarly captured by some or all of the same or different logs or components of the system.

The notification campaign repeats 528 for the next card holder 404 in the queue 405.

Figure 6:
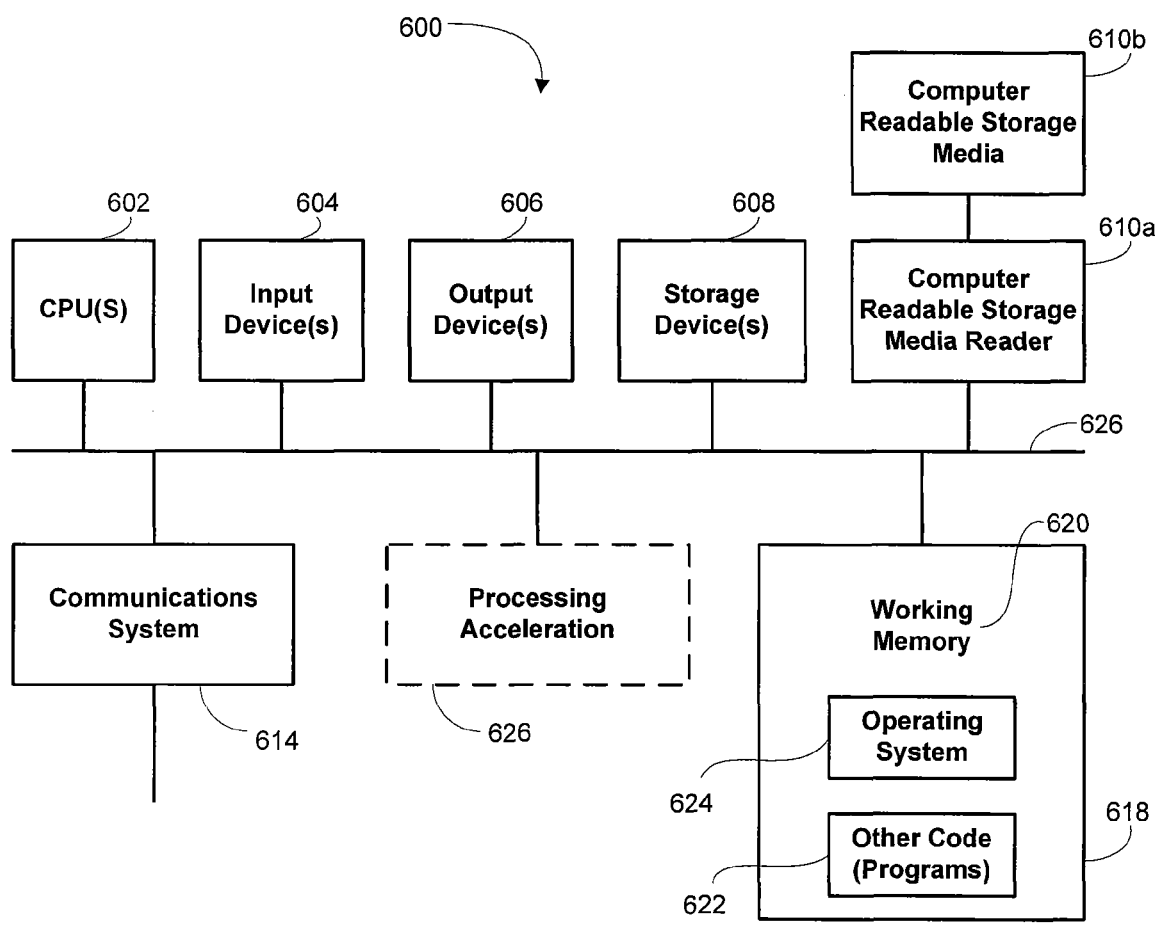
FIG. 6 is a schematic diagram of a computational device on which methods of the invention may be embodied.

FIG. 6 provides a schematic illustration of a structure that may be used to implement a computational device 600 implementing embodiments of the invention. FIG. 6 broadly illustrates how individual system elements may be implemented in a separated or more integrated manner. The computational device 600 is shown comprised of hardware elements that are electrically coupled via bus 626, including a processor 602, an input device 604, an output device 606, a storage device 608, a computer-readable storage media reader 610a, a communications system 614, a processing acceleration unit 616 such as a DSP or special-purpose processor, and a memory 618. The computer-readable storage media reader 610a is further connected to a computer-readable storage medium 610b, the combination comprehensively representing remote, local, fixed, and/or removable storage devices plus storage media for temporarily and/or more permanently containing computer-readable information. The communications system 614 may comprise a wired, wireless, modem, and/or other type of interfacing connection and permits data to be exchanged over the architecture described in connection with FIGS. 1 and 4.

The computational device 600 also comprises software elements, shown as being currently located within working memory 620, including an operating system 624 and other code 622, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

It will be appreciated that components of the systems described herein can be rearranged or connected differently to perform similar or identical functions; and steps of the methods described herein may be performed in alternate orders and still provide similar or identical results. Further, it will be appreciated that, although the embodiments of the invention are described with reference to a single account holder, a single iteration of a method, or a single component of a system; performance may be enhanced by constructing the system or executing the method to work in parallel. For example, an equivalent system may be constructed with a plurality of outbound calling systems, prompters, databases, and peripheral devices to execute a notification campaign which calls hundreds of customers simultaneously.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for executing an automated network-based notification campaign implemented by at least one processor, the method comprising:
    acquiring, via the at least one processor, suspect account information, the suspect account information comprising customer information corresponding to an account holder of a group of account holders, a telephone number corresponding to the account holder, and campaign information, the campaign information relating to a security breach affecting the group;
    transmitting, via the at least one processor, the suspect account information to an outbound calling system;
    extracting, via the at least one processor, the telephone number from the suspect account information;
    establishing, via the at least one processor, a network connection between the outbound calling system and the account holder using the telephone number;
    running, via the at least one processor, a connection successful routine when the network connection is successfully established, wherein running the connection successful routine comprises:
        communicating at least a portion of the campaign information to the account holder,
        communicating to the account holder a plurality of options for responding to the security breach, the options comprising canceling an account, blocking an account, issuing a new transaction card for an account, blocking an old transaction card for an account, or speaking to a customer service representative;
        receiving a response from the account holder, the response selecting at least one of the options;
        updating a connection log to reflect successful establishment of the network connection, wherein the connection log contains data on failures of connection attempts to account holders of the group; and
    running, via the at least one processor, a connection unsuccessful routine when the network connection is not successfully established, wherein running the connection unsuccessful routine comprises:
        updating the connection log data to reflect a failed network connection attempt;
        analyzing at least a subset of the connection log data; and
        determining, based on the analysis, a trend for successfully establishing network connections to account holders of the group.

2. The method recited in claim 1 wherein the suspect account information comprises information from a compromised financial instrument.

3. The method recited in claim 1 wherein the suspect account information comprises information from a non-activated financial instrument.

4. The method recited in claim 1 wherein the suspect account information comprises information from a financial instrument experiencing atypical account activity.

5. The method recited in claim 1 wherein the campaign information corresponds at least in part to the account holder.

6. The method recited in claim 1 wherein running the connection successful routine further comprises:
    prompting the account holder to collect response information; and
    transmitting the response information to a database.

7. The method recited in claim 6 wherein the response information comprises DTMF signals.

8. The method recited in claim 6 wherein the database is a call base.

9. The method recited in claim 6 wherein the database is the outbound calling system.

10. The method recited in claim 6 wherein the database is directed by at least one of the outbound calling system, the prompter, or an institution.

11. The method recited in claim 1 wherein running the connection successful routine further comprises:
    transmitting campaign function information to a custom statement formatter;
    customizing a customer statement based on the campaign function information; and
    transmitting the customer statement to a peripheral device.

12. The method recited in claim 11 wherein the campaign function information derives from at least one of the customer information, the campaign information, the connection log, or the response information.

13. The method recited in claim 11 wherein the peripheral device is a printer.

14. The system recited in claim 13 wherein the printer is a card printer.

15. The method recited in claim 1, further comprising updating, via the at least one processor, the suspect account information based on the connection log.

16. The method recited in claim 1, further comprising securing sensitive information.

17. The method cited in claim 16, wherein the sensitive information comprises sensitive portions of at least one of the customer information, the campaign information, the connection log, or the response information.

18. A system for executing an automated network-based notification campaign, the system comprising:

a source of suspect account information, the suspect account information comprising customer information corresponding to an account holder of a group of account holders, a telephone number corresponding to the account holder, and campaign information, the campaign information relating to a security breach affecting the group;

an outbound calling system comprising a connection to a telephone network, instructions for establishing a network connection via the telephone network to the telephone number, and instructions for communicating at least a portion of the campaign information to the account holder;

a prompter comprising handling instructions for:
communicating to the account holder a plurality of options for responding to the security breach, the options comprising canceling an account, issuing a new transaction card for an account, blocking an old transaction card for an account, or speaking to a customer service representative; and
handling response information, a database comprising information for establishing a connection to at least one of the outbound calling system or the prompter;

a connection log comprising data entries indicating the failure of network connections via the telephone network; and a statistical analyzer, comprising instructions for analyzing at least a subset of the data entries to determining to determine a trend for successfully establishing network connections to account holders of the group who share at least one similar characteristic.

19. The system recited in claim 18 wherein the suspect account information comprises information from a compromised financial instrument.

20. The system recited in claim 18 wherein the suspect account information comprises information from a non-activated financial instrument.

21. The system recited in claim 18 wherein the suspect account information comprises information from a financial instrument experiencing atypical account activity.

22. The system recited in claim 18 wherein the database is a call base.

23. The system recited in claim 18 wherein the database is directed by at least one of the outbound calling system, the prompter, or an institution.

24. The system recited in claim 18 wherein the suspect account information is adjusted to reflect information in the connection log to enhance the efficacy of the notification campaign.

25. The system recited in claim 18, further comprising a customer statement formatter.

26. The system recited in claim 25, further comprising a peripheral device in communication with at least one of the custom statement formatter, the database, or the outbound calling system.

27. The system recited in claim 26 wherein the peripheral device is a printer.

28. The system recited in claim 27 wherein the printer is a card printer.

29. The system recited in claim 18 wherein the campaign information corresponds at least in part to the account holder.

30. The system recited in claim 18 wherein the response information comprises DTMF signals.

31. The system recited in claim 18, further comprising an information security system for securing sensitive information.

\* \* \* \* \*

UNITED STATES PATENT AND TRADEMARK OFFICE
CERTIFICATE OF CORRECTION

PATENT NO.        : 8,170,930 B2                         Page 1 of 1
APPLICATION NO.   : 11/458864
DATED             : May 1, 2012
INVENTOR(S)       : Steven T. Brown et al.

It is certified that error appears in the above-identified patent and that said Letters Patent is hereby corrected as shown below:

Claim 18, col. 11, line 28, after "data entries" delete "to determining".

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

PATENT NO. : 8,170,930 B2
APPLICATION NO. : 11/458864
DATED : May 1, 2012
INVENTOR(S) : Steven T. Brown et al.

Page 1 of 1

It is certified that error appears in the above-identified patent and that said Letters Patent is hereby corrected as shown below:

In the Claims:

Claim 14, col. 10, line 55, "A system recited in claim 13" should read --A method recited in claim 13--.

Claim 18, col. 11, line 16, after "canceling an account," insert --blocking an account,--.

Signed and Sealed this
Third Day of September, 2013

Teresa Stanek Rea
*Acting Director of the United States Patent and Trademark Office*